UNITED STATES PATENT OFFICE.

SIMON WEIS AND SAMUEL WASHINGTON WEIS, OF NEW ORLEANS, LOUISIANA.

PROCESS OF RIPENING COTTON-BOLLS.

SPECIFICATION forming part of Letters Patent No. 470,771, dated March 15, 1892.

Application filed October 21, 1891. Serial No. 409,405. (No specimens.)

*To all whom it may concern:*

Be it known that we, SIMON WEIS and SAMUEL WASHINGTON WEIS, citizens of the United States, residing at New Orleans, in the parish of Orleans and State of Louisiana, have invented new and useful Improvements in the Process of Ripening Cotton-Bolls, of which the following is a specification.

The object of our invention is to obtain a merchantable cotton and seed from green and undeveloped bolls which remain on the plant, from green bolls which, exposed to a rainy season or to frost, would otherwise soften and rot on the stalk, from green bolls obtained by the early pruning of the cotton-plant, (a treatment of greater value to the latter, as it leaves the plant more strength to develop what bolls are left, making the entire product more hardy and prolific,) and, finally, from all green and immature and undeveloped bolls however obtained; and our invention consists in exposing the bolls so obtained to artificial heat between fixed limits and in an unsaturated atmosphere sufficient to mature, develop, and open the bolls, from which we obtain a cotton of which neither the staple nor the texture is injured and also a matured seed.

In order to carry out our invention, we expose the green, immatured, or undeveloped bolls in a room, the air of which is heated to a temperature of not less than fifty (50°) degrees Fahrenheit and not greater than two hundred and fifty (250°) degrees Fahrenheit. At the end of from two to thirty-six hours, dependent upon the degree of heat and the degree of maturity of the bolls, the latter will be found on inspection to have opened, the seed to have changed color, and the fiber to have burst from the bolls, presenting in every respect an appearance similar to that of the bolls ripened by a natural process.

It is immaterial whether the heat be moist or dry, provided it be not moist to saturation, which would rot the fiber.

We have set a minimum and maximum temperature between fifty (50°) and two hundred and fifty (250°) degrees Fahrenheit. Below 50° temperature the process of maturing is too slow to be of any commercial value; above 250° the cotton is liable to scorch.

As the bolls differ in maturity and in size, the length of time for their exposure cannot be precisely defined and is properly determined by inspection of the bolls while undergoing treatment.

We have obtained good results where bolls have been suspended in an inclosed room exposed to a moist heat of about 150° for twenty-four hours, at the end of which time the cotton was in proper condition for picking and ginning. The degree of moisture indicated on a Mithoff's spiral hygrometer was sixty (60°). We have also obtained satisfactory results by exposing the bolls placed in one or more layers in a wire rack, a heater being placed beneath the rack. It is desirable that the hot air should have a free circulation around the bolls, as in nature, and that suitable ventilation be provided.

Within the limits of temperature stated we do not confine ourselves to any fixed degree of heat, it being understood that commercial fiber can be obtained at any point between these limits; neither do we limit ourselves to the quality of the heat, whether dry or moist, provided it be not moist to saturation, nor to any predetermined time for the process, said time being determined by inspection of the bolls by the attendant in charge of the process; neither do we limit ourselves to any particular apparatus for carrying out our process, as the apparatus can be widely varied without departing from the spirit of our invention. The cotton thus obtained is free from dust and sand and can be picked and ginned by well-known mechanical means, as in the case of cotton naturally developed.

The seed which is ripened by this process can be treated for the oil and other products in the same way as the seed which has been naturally ripened.

We are aware that it is old to ripen fruit by a low degree of heat in the presence of an absorbent; neither do we claim the same; but we believe it to be new to treat the waste and immature bolls of the cotton-plant with a process by which are simultaneously obtained two merchantable products—the fiber and the seed.

Having thus described our invention, what we claim as new, and desire to secure by Letters Patent, is—

The process of obtaining a commercial cotton fiber and commercial seed at one operation from immature cotton-bolls, which consists in exposing unripe bolls to artificial heat between 50° and 250° Fahrenheit in an unsaturated atmosphere for a period ranging from two to thirty-six hours, whereby the boll is opened, the cotton fiber matured, and the seed ripened.

In testimony whereof we have hereunto set our hands in the presence of two subscribing witnesses.

SIMON WEIS.
SAMUEL WASHINGTON WEIS.

Witnesses:
JOSEPH E. FRIEND,
G. ALETRINO.